United States Patent [19]
Hartog et al.

[11] Patent Number: 5,369,741
[45] Date of Patent: Nov. 29, 1994

[54] METHOD FOR PRE-CLIPPING A LINE LYING WITHIN A CLIPPING RECTANGULAR REGION WHICH IS A SUBSET OF A REGION OF A DISPLAY SCREEN

[75] Inventors: Adrian H. Hartog, Toronto; Robin E. R. Davies, Ottawa, both of Canada

[73] Assignee: ATI Technologies, Ontario, Canada

[21] Appl. No.: 854,806

[22] Filed: Mar. 19, 1992

[30] Foreign Application Priority Data

Jan. 24, 1992 [CA] Canada .................................. 2060039

[51] Int. Cl.⁵ ............................................ G06F 15/62
[52] U.S. Cl. ................................... 395/143; 395/133; 395/134
[58] Field of Search ................................ 395/140–143, 395/133, 139, 135

[56] References Cited

U.S. PATENT DOCUMENTS 5,157,764 10/1992 Priem et al. ..................... 395/134 X

*Primary Examiner*—Heather R. Herndon
*Assistant Examiner*—Almis Jankus
*Attorney, Agent, or Firm*—Charles Wands

[57] ABSTRACT

A method for drawing lines on a graphics device in such manner in that only those points lying inside a specified rectangular area of the device are drawn. Predetermined digital outcodes are generated for defining the endpoints of the lines and a decision is made whether to draw or not draw the lines based on the relationship of the endpoints with respect to both the specified rectangular area of the device, and a second larger rectangular area of the device.

7 Claims, 3 Drawing Sheets

METHOD FOR PRE-CLIPPING A LINE LYING WITHIN A CLIPPING RECTANGULAR REGION WHICH IS A SUBSET OF A REGION OF A DISPLAY SCREEN

FIELD OF THE INVENTION

The present relates in general to computer graphics, and more particularly to a method for preclipping lines to lie within a clipping rectangle region of a display device.

BACKGROUND OF THE INVENTION

Computer graphics systems are well known for displaying points, lines and character strings within a displayable screen region of a display device. It is often desirable to limit the lines, polygons etc. to a specific rectangular clipping region of the screen. Thus, given a line, and a clipping region, clipping algorithms are well known for drawing only pixels on a segment of the line which lies within the clipping region.

When the line segment is not identical to the line, a segment may be determined by several different methods, all of which have been found to be computationally intensive, resulting in slow graphics generation.

For the special case in which the clipping region is rectangular, the most commonly used algorithm is the Cohen-Sutherland clipping algorithm. A complete description of this prior art approach may be found in the text book "Fundamentals of Interactive Computer Graphics", revised edition, J. D. Foley and A Van Dam Addison Wesley, Reading, Massachusetts, July 1984.

The Cohen-Sutherland clipping algorithm categorizes lines as trivially rejected, trivially accepted, or as requiring further processing. When the line lies entirely within a clipping rectangle, or when the line segment is a null line, no further processing is required. By quickly identifying the lines which can be trivially accepted or rejected, the Cohen-Sutherland algorithm provides greatly improved graphics performance over the above-mentioned prior art approaches.

The Cohen-Sutherland algorithm generates a four bit outcode for each endpoint of the line segment. Each bit of the outcode is set to a logic "1" provided a given relation between the endpoint and the clipping region is true, as follows:

Bit 1: endpoint is above the clipping rectangle.
Bit 2: endpoint is below the clipping rectangle.
Bit 3: endpoint is to the left of the clipping rectangle.
Bit 4: endpoint is to the right of the clipping rectangle.
Otherwise, the bit is false (i.e. set to a logic "0").

Table 1 illustrates the listing and orientation of the 4 bit outcodes generated by the Cohen-Sutherland algorithm relative to the four coordinates defining the clipping region (i.e. xmin, xmax, ymin, ymax).

TABLE 1

|        |         |        |         |        |
|--------|---------|--------|---------|--------|
|        | 0101    |        | 0001    | 1001   |
| (ymin) |         |        |         |        |
|        | 0100    |        | 0000    | 1000   |
| (ymax) |         |        |         |        |
|        | 0110    |        | 0010    | 1010   |
|        | (xmin)  |        | (xmax)  |        |

Prior art digital hardware has been developed for calculating the respective bits of the outcode by examining the sign-bit of the results of each of the following calculations:

Bit 1: (y-ymin)
Bit 2: (ymax-y)
Bit 3: (xmin-x) and
Bit 4: (x-xmax)

$C_0$ and $C_1$ are defined according to the Cohen-Sutherland algorithm as the clip outcodes for the opposite endpoints of a line segment, and the following conditions can be tested:

(1) (($C_0$ BIT_AND $C_1$)!=0) is sufficient to indicate that the entire line segment lies outside the clipping rectangle (although not a necessary condition)

(2) (($C_0$ BIT_OR $C_1$)=0) is a necessary condition for the entire line segment to lie inside the clipping angle.

If condition (1) is true, then the line segment is discarded because it must lie entirely outside the clipping rectangle.

If condition (2) is true, then the line segment lies entirely inside the clipping rectangle, and the line is drawn without further processing.

If neither condition holds, the line requires further processing to determine whether it lies partially inside or outside the clipping rectangle.

Many existing interactive computer graphics systems are capable of generating lines, polygons, etc. within a predetermined region known as the graphics device coordinate space which is often larger than the displayable screen region. According to the prior art Cohen-Sutherland clipping algorithm, all lines crossing the edge of the clipping rectangle into the graphic device coordinate space require further processing by a host processor. Studies have indicted that the additional processing time required to clip a line following the Cohen-Sutherland algorithm takes roughly 300 times longer than it takes to draw a line which does not require further processing.

In addition, because of the required additional processing for lines lying to the left of the clipping rectangle according to Cohen-Sutherland, this algorithm cannot be used to clip polygon boundary lines.

SUMMARY OF THE INVENTION

According to the present invention, a method is provided for preclipping lines based on the relationship of the endpoints of the lines to both the specified rectangular clipping area, and the typically larger graphic device coordinate space. According to the method of the present invention, the trivial rejection condition must fail (as it does using the Cohen-Sutherland algorithm), and in addition at least one of the endpoints must fall outside the larger graphics device coordinate space.

The advantages of the present invention are most evident when one considers a typical case in which the graphics device coordinate space is larger than the clipping rectangle. For the purpose of explanation, "w" may be defined as the minimum distance between any point on the boundary of the graphics device coordinate space and the clipping rectangle region. It is apparent that any line which requires further processing by the host processor must be of at least length 37 w". Studies have indicated that for typical computer drawing applications, the average length of a line is less than 50 pixels. For some common applications, the average length of a line may be close to one pixel. Therefore if "w" is sufficiently large, most lines which would have required processing under the Cohen-Sutherland algorithm do not require any further processing according to the method of the present invention.

For typical applications, approximately 1 line in 1200 crosses the boundary of the clipping region, and would require further processing under the Cohen-Sutherland algorithm. Of these, typically only 1 in 10 will require further processing in accordance with the method of the present invention. As discussed above, the additional processing required to clip a line following the prior art Cohen-Sutherland approach takes approximately 300 times longer than it takes to draw a line which does not require further processing. Under these circumstances, the method of the present invention has been determined to yield up to a 25% speed improvement over the prior art Cohen-Sutherland algorithm. Furthermore, in the event the prior art Cohen-Sutherland algorithm is implemented on a processor with weak floating point, or a processor having deficient extended precision arithmetic (e.g. an Intel TM 80286 processor without a math co-processor), additional processing may take as much as 1200 times longer than it takes to draw a line which does not require further processing. Under these circumstances, the performance difference between the present invention and the prior art Cohen-Sutherland algorithm may be as much as 150%.

In addition, according to the present invention, boundary outlines may be preclipped, which cannot be done using only the prior art Cohen-Sutherland algorithm. According to the present invention, the x coordinates of most lines falling to the left of the clipping rectangle boundary region to be drawn are clamped without further processing. In the event a line falls to the left of the clipping rectangle, such a line may require further processing only in the event that is longer than the length "w".

In accordance with an embodiment of the invention, in a graphics generating device adapted to be used with a host processor for generating lines within a displayable region of a screen, the graphics device being capable of generating the lines without intervention by the host processor provided endpoints of the lines lie in a graphics device coordinate region which is larger than the displayable region, a method for pre-clipping the lines to lie within a clipping rectangle region which is a subset of the displayable region, is comprised of the steps of generating a first pair of digital outcodes $C_0$ and $C_1$ defining start and end coordinates, respectively, for each the lines within the clipping rectangle region; generating a second pair of digital outcodes $D_0$ and $D_1$ defining start and end coordinates, respectively, for segments of each the lines within the graphics device coordinate region; rejecting predetermined ones of the lines for which the condition ($C_0$ BIT_AND $C_1$)!=0 is true; drawing predetermined ones of the lines for which the conditions ($C_0$ BIT_AND $C_1$)!=0 and ($D_0$ BIT_OR $D_1$)! =0 are false; and invoking intervention by the host processor for additional processing of predetermined ones of the lines having respective start and end coordinates outside the graphics device coordinate region.

In accordance with another embodiment of the invention, in a graphics generating device for generating lines within a graphics device coordinate region and displaying the lines within a displayable region of a screen, the displayable region being a subset of the graphics device coordinate region, a method for pre-clipping the lines to lie within a clipping rectangle subset of the displayable region, is comprised of the steps of generating a first pair of digital outcodes $C_0$ and $C_1$ defining start and end coordinates, respectively, for each of the lines within the clipping rectangle region; generating a second pair of digital outcodes $D_0$ and $D_1$ defining start and end coordinates, respectively, for segments of each the lines within the graphics device coordinate region; rejecting predetermined ones of the lines for which the condition ($C_0$ BIT_AND $C_1$)!=0 is true; and drawing predetermined ones of the lines for which the conditions ($C_0$ BIT_AND $C_1$)!=0 and ($D_0$ BIT_OR $D_1$)!=0 are false.

In general, an embodiment of the invention is a method of drawing a line on a graphics device by means of a computer whereby only those points lying inside a specified rectangular area of the device are drawn, is comprised of determining the specified area of the device, determining a second area larger than the specified area, generating outcodes defining the endpoints of the line, preparing a logical decision, based on the relationship of the endpoints with respect to both the specified area and the larger area, whether or not to draw said line. A decision is made not to draw the line in the event both endpoints of the line fall outside the specified area, to draw the line in the event one endpoint of the line falls within the specified area and the other endpoint falls inside the larger area, or to not draw the line in the event at least one endpoint falls outside the larger area.

BRIEF DESCRIPTION OF THE DRAWINGS

A preferred embodiment of the present invention will be described in detail below with reference to the following drawings, in which.

DETAILED DESCRIPTION OF THE PREFERRED EMBODIMENT

Figure 1:
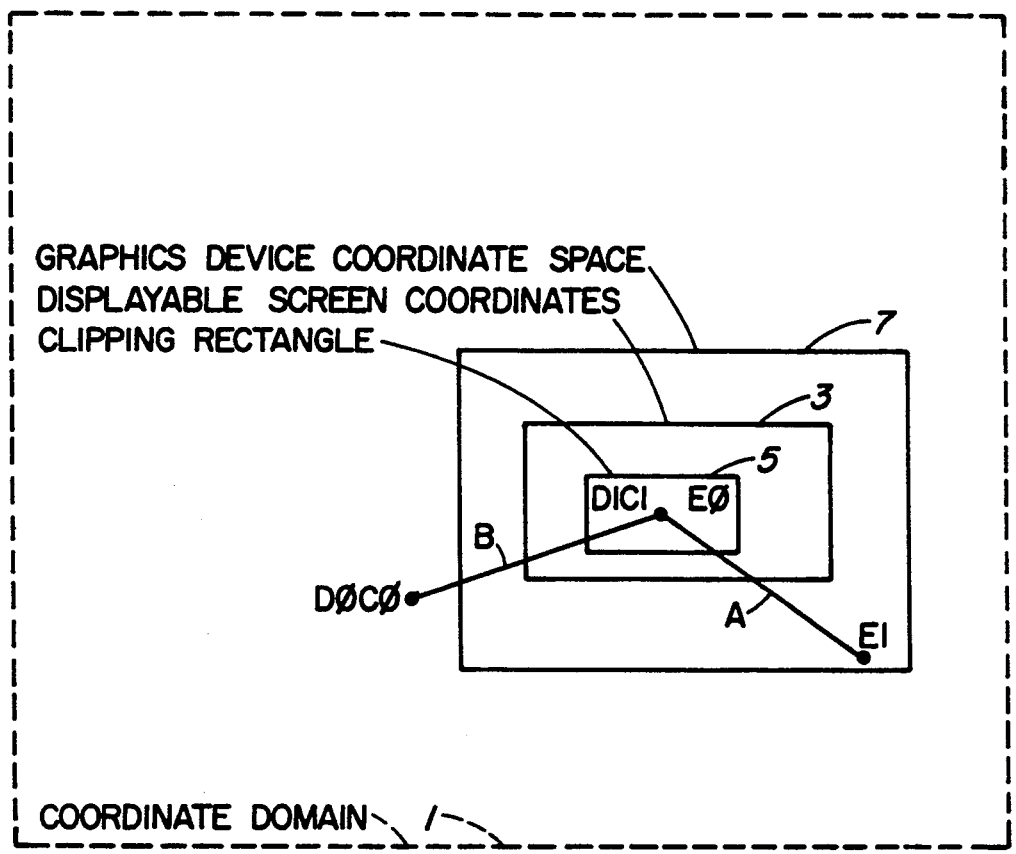
FIG. 1 is a block diagram showing relationship of the coordinate regions in accordance with the present invention.

In the present invention, linedraw pre-clipping operates within the regions of drawing space illustrated in FIG. 1. A coordinate domain 1 is the domain of all possible line endpoints. The coordinate domain can be extended to three dimensional space as well.

A displayable screen region 3 is a region within the coordinate domain space that may be displayed on the screen. Usually, the region 3 is significantly smaller than the coordinate domain 1.

A clipping rectangle 5 is a rectangular region having boundaries to which line segments must be clipped. The clipping rectangle 5 is a subset of the displayable screen region 3.

A graphics device coordinate space 7 is an arbitrarily defined region within which both line end points must lie in order for the graphics engine of the present invention in a computer to draw the line without intervention from the computer host processor. The graphics device coordinate space 7 may be of any size, with the restrictions that it must be larger than the clipping rectangle 5 and no larger than the coordinate domain 1.

In a successful prototype of the invention, the graphics device coordinate space 7 extended for 512 pixels in each direction around the displayable screen coordinate space 3. It is possible that the graphics device coordinate space in some graphics systems may be the same as that of the displayable screen region 3. However, the present invention is specifically designed for use with graphics devices wherein the graphics device coordinate space 7 is larger than the displayable screen region 3.

As can be seen in FIG. 1, the graphics device coordinate space 7 is smaller than the coordinate domain 1. However, there are in existence graphics devices in which the graphics device coordinate space 7 is equal to the coordinate domain 1. For use with these devices, the present invention may be used by arbitrarily defining the graphics device coordinate space 7 to be a smaller region than the coordinate domain 1 in order to prevent extremely long lines which lie off screen from being drawn. For example, a line extending from one extreme edge of the coordinate domain 1 to the opposite edge thereof, passing through the clipping rectangle 5, may be too long to be efficiently processed using post-clipping algorithms alone. The graphics device coordinate space 7 places an implicit restriction on the longest possible drawn line since both ends of the line must be inside the graphics device coordinate space 7 to be drawn in accordance with the present invention, such as line segment A in FIG. 1.

In contradistinction to the prior art Cohen-Sutherland algorithm, outcodes are generated in the method of the present invention for both the clipping rectangle 5 and the device coordinate space 7, and both sets are used to determine whether further processing should be done by the computer processor. Since the grpahics coordinate space is larger than the displayable screen coordinate space, a very fast clipping can be done by the graphics engine for lines wholly within this space, a substantial increase in speed of operation is realized.

Specifically, according to the method of the present invention, outcodes $C_0$ and $C_1$ are generated for the start and endpoints respectively of a representative line segment B with respect to the clipping rectangle region 5. In addition, outcodes, $D_0$ and $D_1$ are generated for the start and endpoints respectively, of the line segment with respect to the graphics device coordinate space 7.

For ordinary strokes lines, the following conditions are tested:

(3) $((C_0 \text{ BIT\_AND } C_j)! = 0$ is a sufficient condition to ensure that no part of the line falls inside the clipping rectangle region 5 (although not a necessary condition).

(4) $((D_0 \text{ BIT}_{13} \text{ OR } D_1)! = 0)$ is a necessary condition to ensure that no part of the line falls outside graphics device coordinate space 7.

If condition (3) is true, the line is rejected and no further processing takes place on the line.

If condition (3) is false, and condition (4) is false (e.g. line A), the line is drawn (trivially accepted); part of the line may fall outside the clipping rectangle 5, but post-clipping may be used to prevent those pixels from being updated. Post-clipping apparatus that each point on the line is individually checked to see if it falls within the graphics device coordinate space 7 (as contrasted with pre-clipping which calculates the start and endpoints of the subset of the line which falls within the region 5).

Otherwise, condition (4) must be true, and condition (3) must be false. the line may pass inside the clipping rectangle 5, but cannot be drawn because it lies outside graphics device coordinate space 7 (e.g. line B), in which case the line must be subjected to further processing by the host computer processor using a more computationally intensive clipping algorithm.

The method of the present invention may be extended for use with polygon-boundary lines. Modified Bresenham-stye line draw procedures can be developed to allow direct implementation of the well known sentinel-flag linedraw algorithm. When drawing polygon outlines into a clipped region, however, any line drawn to the left of the clipping rectangle 5 must be converted so that it is drawn just inside the left boundary of the clipping rectangle instead. When performing post-clipped polygon outline drawing, this is usually accomplished by clamping the X-coordinate to the value of xmin for each pixel which lies to the left of the clipping rectangle 5.

The prior art Cohen-Sutherland algorithm has been found to be inadequate when drawing polygon outline lines because of the requirement that lines falling to the left of the clipping rectangle must be clamped to the edge thereof, which the algorithm cannot take into account.

However, in accordance of the present invention, polygon-outline lines may be accommodated provided that when the X-coordinate of a line segment endpoint falls to the left of the graphics device coordinate space 7, the x-coordinate for the endpoint is automatically assigned the minimum x-coordinate (xmin) for the remainder of drawing calculations and processing. Outcodes, however, are generated from the original end point coordinates.

Postclipping processing may also be performed as well as left clamping of pixels when pixels fall to the left of the clipping rectangle 5, (but inside the graphics device coordinates space 7).

Two additional expressions are generated for each line segment when drawing polygon outline line, as follows:

(5) $((C_0 \text{ BIT\_AND } C_1) \text{ BIT\_AND } (\text{NOT LEFT\_BIT})! = 0)$.

(6) $((D_0 \text{ BIT}_{-OR} D_1) \text{BIT\_AND } (\text{NOT LEFT}_{-BIT})! = 0)$.

These two conditions are analogous to conditions (3) and (4) above but do not consider whether the points in question are to the left of the region in question.

The action taken for any given lines is summarized in Table 2, relative to the conditions (3)-(6).

TABLE 2

| Expression 3 | Expression 4 | Expression 5 | Expression 6 | Action |
|---|---|---|---|---|
| False | False | — | — | Draw |
| False | True | False | — | Process |
| True | False | False | — | Draw |
| True | False | True | — | Reject |
| True | True | False | False | Draw |
| True | True | False | True | Process |
| True | True | True | — | Reject |

Table 2 covers all possible results for each of conditions (3), (4), (5) and (6). The decision to trivially accept, reject, or subject to further processing is made solely on the basis of the four outcode tests.

Figure 2:
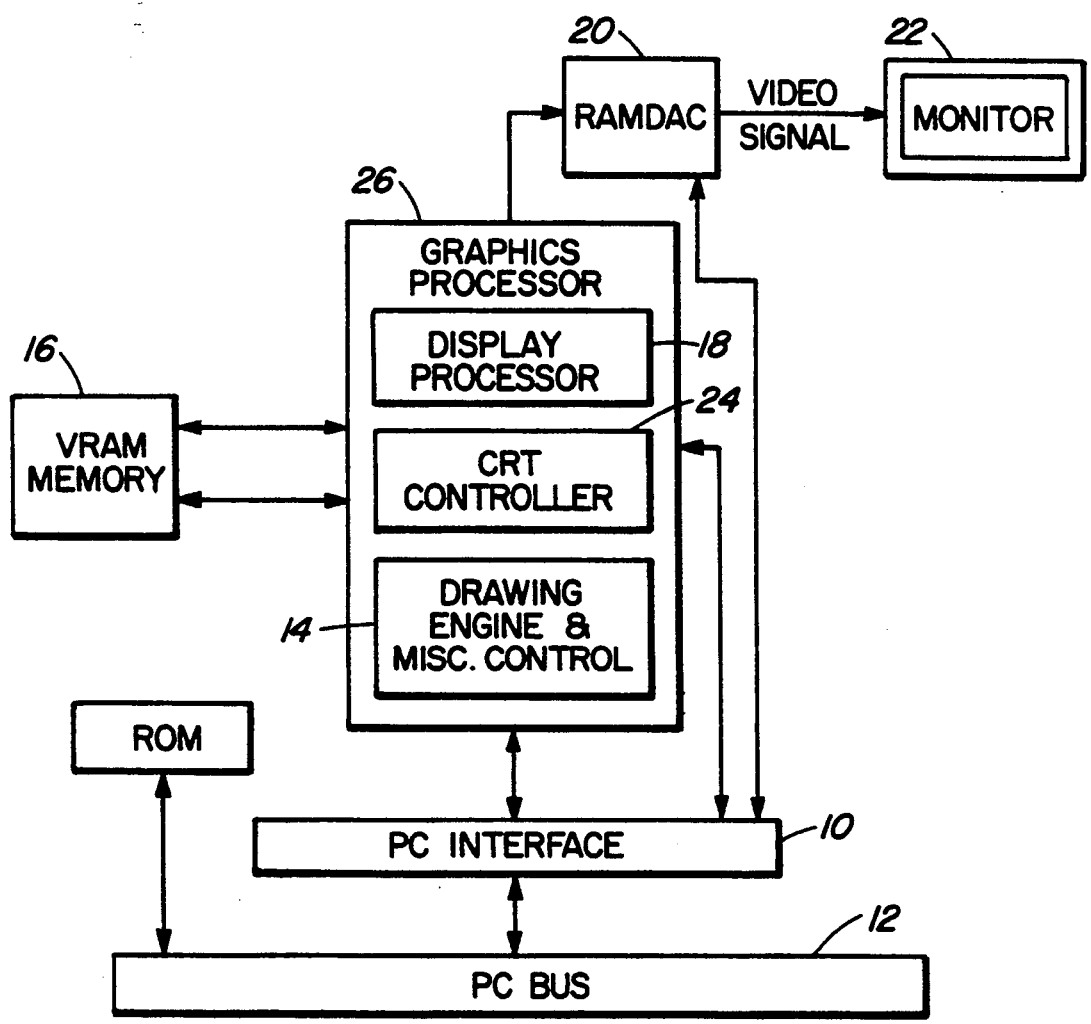
FIG. 2 is a block diagram of the architecture of a graphics engine for implementing the method of the present invention (see below)

Implementation of the invention may be performed in a graphics engine in a graphics processor such as the one illustrated in FIG. 2. FIG. 2 is a reproduction of FIG. 2-A which is illustrated on page 41 of the publication "Graphics Programming for the 8514/A" by Jake Richter and Bud Smith, published by M&T Publishing Inc., Redwood City, Calif., Copyright 1990.

The reader is referred to a complete description of the structure and operation of the block diagram of FIG. 2 in the aforenoted publication, which is incorporated herein by reference. However, in general, the PC (computer) interface 10 handles data transfer between the computer, via the PC bus 12 to which the main central processor of the computer (not shown) is connected, and the drawing engine 14 of the graphics processor. The drawing engine 14 takes commands from the main processor, decodes them, and executes them, updating the VRAM memory 16, etc. A display processor 18 reads the VRAM memory 16 and outputs a signal to lookup table and D/A converter RAMDAC 20, which outputs a video signal to monitor 22, to draw an image using the CRT controller. The display processor 18, drawing engine 14 and monitor CRT controller 24 are shown contained in a block 26 labelled graphics processor.

Figure 3:
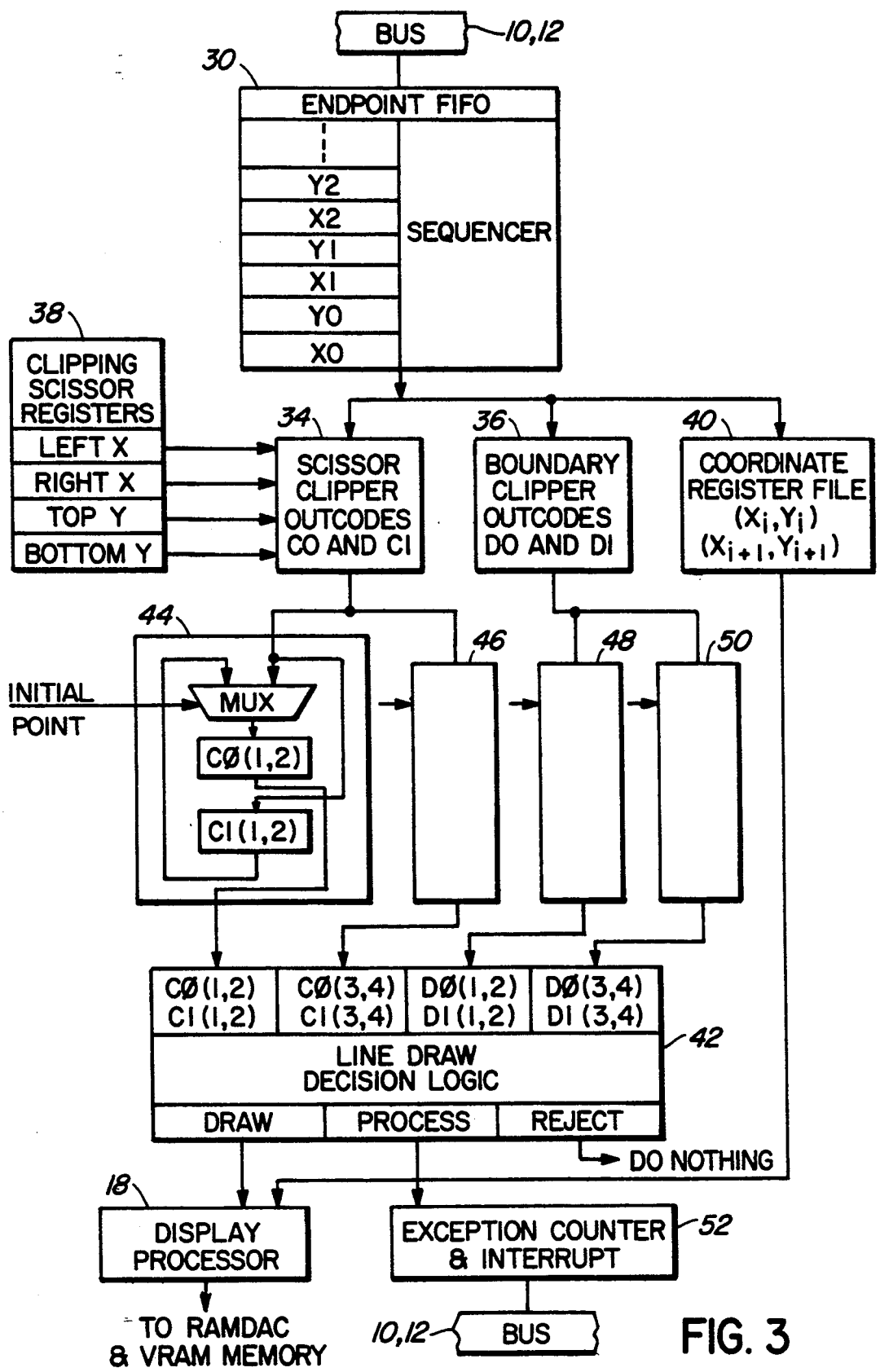
FIG. 3 is a block diagram illustrating a plurality of direct linedraw registers for implementing the method of the present invention (see below)

The present invention is implemented in the drawing engine 14, a more detailed block diagram of which is shown in FIG. 3. Operation thereof will be described with reference also to FIG. 4, which illustrates a sequence of lines to be processed, with their coordinates, and Table 3, below.

Figure 4:
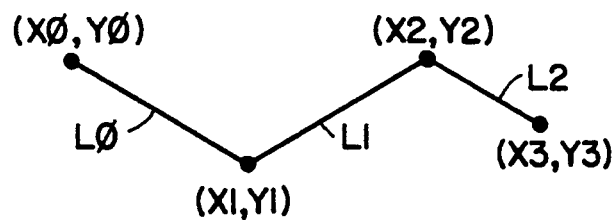
FIG. 4 illustrates some lines to be processed using the present invention.

Referring first to FIG. 4, a sequence of lines is shown, the ends of which have orthogonal coordinates X0, Y0, and X1, Y1 for line L0; X1, Y1, and X2, Y2 for line L1; and X2, Y2 and X3, Y3 for line L2.

If we consider the endpoint X0, Y0 as the initial point in the sequence of lines, then initial and endpoints may be defined for each line as follows:

TABLE 3

| Lines | Initial Point | Ending Point |
| --- | --- | --- |
| L0 | X0, Y0 | X1, Y1 |
| L1 | X1, Y1 | X2, Y2 |
| L2 | X2, Y2 | X3, Y3 |

It is clear that, omitting the first point, the initial point of each line is the same as the ending point of the previous line. Therefore for all but the first line, the end outcodes of the previous line, C1, D1, may be used for the initial outcodes C0, D0 of the current line. This minimizes the number of outcodes which must generated.

It is preferred that the present invention should implement this technique where the initial outcode for the first line is generated explicitly but for all subsequent lines the initial outcode is loaded with the ending outcode of the previous line in the same step as the ending outcode for the current line is generated.

The block diagram of FIG. 3 is used to generate the initial outcodes for the first line and the ending outcodes for the first and all subsequent lines and to evaluate the conditions 3–6 and Table 2 noted above.

An endpoint FIFO 30 which includes a sequencer 32 is connected to the system PC bus via interface 10 (labelled as 10, 12). The sequencer notes the content of the FIFO. Once the FIFO contains data, it increments it.

The FIFO is loaded from the system central processor in sequence with the coordinates of the sequence of lines, X0, Y0, X1, Y1, X2, Y2, etc. These coordinates are passed in parallel to a scissor clipper 34 and a boundary clipper 36.

Stored in clipping scissor registers 38 are the LEFTX, RIGHTX, TOPY and BOTTOMY coordinates of the clipping rectangle which had been loaded from the main computer processor. The scissor clipper 34 compares those values with the values received from the endpoint FIFO 30, and generates outcode C0, the beginning of the first line, and C1, the beginning of the following line, the outcode for the end of the first line. Within the scissor clipper 34 each X coordinate is compared to the LEFTX and RIGHTX scissor register to generate the third and fourth bit of either outcode C0 or outcode C1, depending on whether this is the initial point of the first line, or one of the subsequent endpoints. Similarly each Y coordinate is compared to the content of the TOPY and BOTTOMY scissor registers to generate the first and second bits of either outcode C0 or outcode C1.

In parallel, within boundary clipper 36, each X coordinate is compared to fixed LEFT (e.g. pixel-512) and RIGHT (pixel 1535) boundary X values of the graphics coordinate space to generate the third and fourth bits of either outcode D0 or outcode D1. Similarly each Y coordinate is compared to fixed TOP (e.g. pixel-512) or BOTTOM (pixel 1535) boundary Y values to generate the first and second bits of either outcode D0 or outcode D1.

Concurrently, the initial $(X(i),Y(i))$ coordinate pair and the ending $(X(i+1),Y(i+1))$ coordinate pair for each line are saved in a coordinate register file 40 for subsequent use if a draw operation is initiated. In similar manner to the outcodes, the ending $(X(i-1),Y(i-1))$ coordinate pair of the previous line is used as the initial $(X(i,Y)i)$ coordinate pair for the current line.

After the ending Y coordinate of each line is evaluated by the scissor clipper 34 and boundary clipper 36 and loaded into the coordinate register file 40, the generated C0, C1, D0 and D1 outcodes are processed in circuits 44, 46, 48 and 50 and are evaluated and an action initiated to conform to the conditions in Table 2. Flags generated at the output of the line draw decision circuit 42 are to initiate a draw, to initiate process or to reject the line (do nothing). The state of these flags are considered and one of the three actions is initiated as will be described below.

The line draw decision circuit 42 is a circuit which logically generates flags in accordance with Table 2. The outcodes C0 and C1 are provided to similar processing circuits 44 and 46 respectively from scissor clipper 34, and the outcodes D0 and D1 are provided to similar processing circuits 48 and 50 respectively, from boundary clipper 36. Each of processing circuits 44, 46, 48 and 50 are identical, and is comprised of a respective multiplexer 52A, 52B, 52C and 52D which receives, respectively, the X and Y coordinates of the beginning and end of each adjoining pair of lines from the coordinate register file, and generates outcodes C0(bits 1,2), C1(1,2), C0(3,4), C1(3,4), D0(1,2), D1(1,2), D0(3,4) and D1(3,4) relating thereto. These outcodes of two adjoining lines and of the graphics device coordinate space are applied to the line draw decision circuit 42 from the processing circuits 44, 46, 48 and 50. Logic within the line draw decision circuit 42 establishes flags conforming to the action listed in Table 2, depending on the resulting expression condition listed therein.

If the draw flag is generated in circuit 42, the display processor 18 is enabled to draw the current line, the coordinates of which are received from the coordinate register file 40, and from the state of all control register bits which effect line draw operations. It is preferred that when the current line is being drawn, no further coordinate points are evaluated. When the current line drawing operation is complete, the next ending point in the endpoint FIFO 30 is evaluated and acted upon.

If the reject flag is generated, the current point is discarded. This is a do nothing condition. The next endpoints are then evaluated.

If the process flag is generated, it is applied to a process exception counter and main processor interrupt register 52, which has its output connected to the bus 12 via the PC interface 10. This causes initiation of a processor interrupt, or it may be polled as a status bit. The main CPU then initiates its own algorithm for dealing with this clipping exception condition. Once the process flag is generated, the current point and all subsequent endpoints are discarded and will not generate a draw operation or change the current state of the graphics drawing engine.

Each endpoint which is discarded increments the process exception counter 52 which may be read by the main processor. In this way the main processor may recover from the exception of the condition even when multiple endpoints are discarded. The process flag and interrupt may be reset by the main processor. This also should clear the process exception counter and allow new endpoints in the endpoint FIFO 30 to be evaluated.

Thus the disclosed process and apparatus will process lines which are in a larger field than is possible previously using a graphics engine, and eliminates a substantial amount of processing by the main processor and, as noted above, results in a very great increase in graphics display speed when a clipping operation is invoked.

A person understanding this invention may now conceive of alternative structures and embodiments or variations of the above. All of those which fall within the scope of the claims appended hereto are considered to be part of the present invention.

We claim:

1. In a graphics generating device adapted to be used with a host processor for generating lines with a region of a display screen and for generating said lines without intervention by said host processor, provided that endpoints of said lines lie in a graphics device coordinate region which is larger than said region, a method for pre-clipping said lines to lie within a clipping rectangle region which is a subset of said region, comprising the steps of:

(a) generating a first pair of digital outcodes $C_0$ and $C_1$ defining start and end coordinates, respectively, for each of said lines having an end within said clipping rectangle region;

(b) generating a second pair of digital outcodes $D_0$ and $D_1$ defining start and end coordinates, respectively, for segments of each said lines having an end within said graphics device coordinate region;

(c) rejecting predetermined ones of said lines for which a condition $(C_0 \text{ BIT\_AND } C_1)! = 0$ is true;

(d) drawing, on said display screen, predetermined ones of said lines for which conditions $(C_0 \text{ BIT\_AND } C_1)! = 0$ and $(D_0 \text{ BIT\_OR } D_1)! = 0$ are false; and (e) invoking intervention by said host processor for additional processing of predetermined ones of said lines having respective start and end coordinates outside said graphics device coordinate region.

2. The method of claim 1, wherein said lines are polygon-boundary lines, further comprising the steps of:

(f) rejecting predetermined ones of said lines for which conditions $(C_0 \text{ BIT\_AND } C_1)! = 0$ and $(C_0 \text{ BIT\_AND } C_1) \text{ BIT\_AND } (\text{NOT LEFT\_BIT})! = 0$ are true;

(g) drawing predetermined ones of said lines for which conditions $(D_0 \text{ BIT\_OR } D_1)! = 0$ and $(C_0 \text{ BIT\_AND } C_1) \text{ BIT\_AND } (\text{NOT LEFT\_BIT})! = 0$ are false and $(C_0 \text{ BIT\_AND } C_1)! = 0$ is true;

(h) drawing further predetermined ones of said lines for which conditions $(C_0 \text{ BIT\_AND } C_1)! = 0$ and $(D_0 \text{ BIT\_OR } D_1)! = 0$ are true and $(C_0 \text{ BIT\_AND } C_1) \text{ BIT\_AND } (\text{NOT LEFT BIT})! = 0$ and $(D_0 \text{ BIT\_OR } D_1) \text{ BIT\_AND } (\text{NOT LEFT\_BIT})! = 0$ are false; and (j) invoking intervention by said host processor for additional processing of predetermined ones of said lines for which conditions $(C_0 \text{ BIT\_AND } C_1)! = 0$ and $(D_0 \text{ BIT\_OR } D_1)! = 0$ and $(D_0 \text{ BIT\_OR } D_1) \text{ BIT\_AND } (\text{NOT LEFT BIT})! = 0$ are true and $(C_0 \text{ BIT\_AND } C_1) \text{ BIT\_AND } (\text{NOT LEFT\_BIT})! = 0$ is false.

3. In a graphics generating device for generating lines within a graphics device coordinate region and displaying said lines within a region of a display screen, said region being a subset of said graphics device coordinate region, a method for pre-clipping said lines to lie within a clipping rectangle subset of said region, comprising the steps of:

(a) generating a first pair of digital outcodes $C_0$ and $C_1$ defining start and end coordinates, respectively, for each of said lines having an end within said clipping rectangle region;

(b) generating a second pair of digital outcodes $D_0$ and $D_1$ defining start and end coordinates, respectively, for segments of each said lines having an end within said graphics device coordinate region;

(c) rejecting predetermined ones of said lines for which a condition $(C_0 \text{ BIT\_AND } C_1)! = 0$ is true; and (d) drawing, on said display screen predetermined ones of said lines for which conditions $(C_0 \text{ BIT\_AND } C_1)! = 0$ and $(D_0 \text{ BIT\_OR } D_1)! = 0$ are false.

4. A method of drawing a line on a graphics device by means of a computer whereby only those points lying inside a specified rectangular region of said graphics device are drawn, comprising the steps of:

(a) determining said specified rectangular area of said graphics device;

(b) determining a second area larger than said specified rectangular area;

(c) generating outcodes defining endpoints of said line;

(d) preparing a logical decision, based upon a relationship of said endpoints with respect to both said specified rectangular area and said larger area, whether or not to draw said line; and (e) drawing said line on said graphics device in accordance with the logical decision prepared in step (d); and wherein said decision prepared in step (d) is to draw said line if both endpoints of the line fall outside of said specified rectangular area, and is to draw said line if one endpoint of said line falls within said specified rectangular area and the other endpoint falls inside of said larger area.

5. A method as defined in claim 4, in which said second area and said larger area are rectangular 6. A method as defined in claim 5, in which said outcodes are determined for both said specified rectangular area and said second area.

7. A method as defined in claim 4 in which said decision is to not draw said line if at least one endpoint falls outside said larger area.

* * * * *